United States Patent Office 3,370,098
Patented Feb. 20, 1968

3,370,098
PREPARATION OF UNSATURATED
HALIDE COMPOUNDS
George E. Illingworth, Mount Prospect, Ill., assignor to Universal Oil Products Company, Des Plaines, Ill., a corporation of Delaware
No Drawing. Filed Jan. 14, 1965, Ser. No. 425,625
14 Claims. (Cl. 260—654)

ABSTRACT OF THE DISCLOSURE

Preparation of an unsaturated halide compound by condensing an alkyl halide with a 1,2-diolefinic compound at a temperature of −50° to 150° C. and a pressure of 1–100 atm. in the presence of a Friedel-Crafts catalyst. The reaction is exemplified by the condensation of isopropyl chloride with propadiene, in the presence of $AlCl_3$ catalyst, to form 2-chloro-4-methyl-1-pentane.

This invention relates to a process for the preparation of vinyl halide compounds and specifically to a process for the preparation of vinyl halide compounds in which the halogen substituent is on a carbon atom which contains a double bond.

The products which are prepared according to the process of the present invention namely, vinyl halide compounds, will find a wide variety of uses in the chemical field. A specific and important use for these compounds are as monomers which are utilized in the preparation of polyvinyl type polymers. The polyvinyl halides which are formed as polymers are widely used as synthetic thermoplastic resins when the halide comprises chlorine. This type of polymer, in the form of a powdery resin, can be converted into the final form which is desired by extrusion, molding or by coating from solutions. The final product, when in a rubber-like form, may be utilized as insulation for electrical wires, sleevings, tubing, flexible pipes, gaskets, etc.; when in final film form it may be utilized as curtains, sheeting, upholstery, waterproof rainware, etc.; it may also be coated on fabrics to be used as auto upholstery, etc.; in final rigid shape or sheets it may be used as decorative panels, phonograph records, pipeline conduits for gas, oil, water and chemicals, as window frames, etc.; in final foam or expanded form, it may be used as padding and cushions, etc. When the halogen substituent is fluorine, the final polyvinyl fluoride is characterized by resistance to outdoor weather, toughness, flexibility and chemical resistance; uses of said polymer include outdoor protective coatings for sidings and roofs, as a replacement for paint, for glazing, packaging and electrical uses. Therefore, as hereinbefore set forth, the monomeric vinyl halides comprise industrially important chemical compounds.

It is, therefore, an object of this invention to provide a process for the preparation of a vinyl halide compound A further object of this invention is to provide a process for the preparation of vinyl halide monomers which are useful as starting materials in the preparation of desirable polymeric compounds.

In one aspect, an embodiment of this invention resides in a process for the preparation of a vinyl halide compound which comprises condensing an alkyl halide with a 1,2-diolefinic compound at condensation conditions in the presence of a metal halide catalyst, and recovering the resultant vinyl halide compound.

A further embodiment of this invention is found in a process for the preparation of a vinyl halide compound which comprises condensing an alkyl halide with a 1,2-diolefinic hydrocarbon at a temperature in the range of from about −50° to about 150° C. and at a pressure of from about atmospheric to about 100 atmospheres in the presence of a Friedel-Crafts type catalyst and recovering the resultant vinyl halide compound.

A specific embodiment of this invention is found in a process for the preparation of a vinyl halide compound which comprises condensing isopropyl chloride with a 1,2-diolefinic hydrocarbon at a temperature in the range of from about −50° to about 150° C. and at a pressure of from about atmospheric to about 100 atmospheric in the presence of a Friedel-Crafts type catalyst and recovering the resultant vinyl halide compound.

A more specific embodiment of this invention is found in a process for the preparation of a vinyl halide compound which comprises condensing propadiene with isopropyl chloride at a temperature in the range of from about −50° to about 150° C. and at a pressure in the range of from about atmospheric to about 100 atmospheres in the presence of aluminum chloride and recovering the resultant 2-chloro-4-methyl-1-pentene.

Other objects and embodiments will be found in the following further detailed description of this invention.

As hereinbefore set forth, the present invention is concerned with a process for preparing vinyl halide monomers by reacting an alkyl halide with an unsaturated compound and more particularly a diolefinic hydrocarbon containing 1,2-unsaturation, said condensation being effected in the presence of a Friedel-Crafts catalyst. The condensation is effected at temperatures within a wide range, said temperatures ranging from about −50° up to about 150° C., the specific reaction temperature being dependent upon the particular reactants undergoing condensation and upon the particular Friedel-Crafts catalyst which is used. In addition, the reaction is also effected at varying pressures, the particular pressure which is used being sufficient to maintain a substantial portion of the reactants in a liquid phase. Therefore, the pressure will range from atmospheric up to about 100 atmospheres or more.

Examples of alkyl halides which will undergo condensation with a 1,2-diolefinic hydrocarbon include methyl chloride, methyl bromide, methyl iodide, methyl fluoride, ethyl chloride, ethyl bromide, ethyl iodide, ethyl fluoride, n-propyl chloride, n-propyl bromide, n-propyl iodide, n-propyl fluoride, isopropyl chloride, isopropyl bromide, isopropyl iodide, isopropyl fluoride, n-butyl chloride, n-butyl bromide, n-butyl iodide, n-butyl fluoride, t-butyl chloride, t-butyl bromide, t-butyl iodide, t-butyl fluoride, n-amyl chloride, n-amyl bromide, n-amyl iodide, n-amyl fluoride, t-amyl chloride, t-amyl bromide, t-amyl iodide, n-amyl fluoride, the isomeric hexyl- heptyl- octyl- nonyl- decyl chlorides, bromides, iodides, fluorides, etc.

Examples of diolefinic hydrocarbons containing a 1,2-type unsaturation which are condensed with the aforementioned alkyl halides include propadiene, 1,2-butadiene, 1,2-pentadiene, 1,2-hexadiene, 1,2 octadiene, 1,2-nonadiene, 1,2-decadiene, and isomers thereof such as 3 - methyl - 1,2 - butadiene, 3 - methyl - 1,2 - pentadiene, 3 - methyl - 1,2 - hexadiene, 3 - methyl - 1,2 - heptadiene, 3,4 - dimethyl - 1,2 - hexadiene, 3,3 - dimethyl - 1,2 - hexadiene, 3,4 - dimethyl - 1,2 - heptadiene, 3,3 - dimethyl-1,2-heptadiene, etc. It is to be understood that the aforementioned alkyl halides and diolefinic hydrocarbons containing 1,2-saturation are only representative of the class of compounds which may be used and that the present invention is not limited thereto.

The catalysts which are utilized to effect the condensation of the present invention comprise metal halide compounds of the type which are generally referred to as Friedel-Crafts type catalysts. Examples of these catalysts include aluminum chloride, ferric chloride, zinc chloride, zirconium chloride, bismuth chloride, aluminum boride, boron fluoride, etc. While boron is a metalloid rather than a metal, for purposes of this invention boron fluoride and particularly boron trifluoride will be considered as a metal halide falling within the class of the above identified Friedel-Crafts type catalyst. As hereinbefore set forth the process of the invention is effected over a relatively wide range of temperatures; while the preferred range is from about 0° to about 150° C. it is contemplated that lower temperatures ranging down to about −50° C. may be utilized. The lower temperatures are used when employing relatively active Friedel-Crafts type catalysts such as aluminum chloride, ferric chloride, etc. Conversely, when using a less active catalyst such as bismuth chloride or zinc chloride, the operating temperatures will be in the upper range, that is, from about 25° to about 150° C.

The condensation of the alkyl halide with the unsaturated hydrocarbon of the type hereinbefore set forth, may be effected in any suitable manner and may comprise either a batch or a continuous type operation. When a batch type operation is used, a quantity of the starting materials comprising the alkyl halide and the 1,2-diolefinic hydrocarbon are placed in a suitable reaction vessel along with the particular Friedel-Crafts type catalyst. One suitable reaction vessel which may be utilized comprises a rotating autoclave. The vessel is then cooled or heated to the desired temperature range for a predetermined residence time, the satisfactory conditions of time and temperature, as hereinbefore stated being dependent upon the particular reactants and the particular catalyst which is used. At the end of the desired residence time, the reaction vessel is allowed to return to room temperature following which the reaction product is separated from the catalyst and from any unreacted starting materials being recovered therefrom by conventional means such as, for example, fractional distillation, crystallization, etc.

It is also contemplated within the scope of this invention that the process may be effected in a continuous manner. When this method is used, the starting materials comprising the alkyl halide and the diolefinic hydrocarbon are continuously charged to a reactor which is maintained at suitable operating conditions of temperature and pressure in which contains the desired catalyst. After a predetermined residence time is elapsed, the reaction product is continuously withdrawn and separated from the reactor effluent. The unreacted starting materials being recycled to form a portion of the feed stock. If the more active catalysts, as those hereinbefore enumerated, are present while employing relatively high temperatures within the aforementioned range, for example, about 25° to about 100° C. the charge rate of the reaction mixture is maintained at a sufficient space velocity to quickly remove the reaction product from the catalyst zone, thereby avoiding undesirable decomposition reactions. Likewise, when the less active catalysts are used within the lower temperatures of the indicated operating temperature range, the reaction must be prolonged in order to obtain substantial condensation products of the reaction. It is contemplated within the scope of this invention that reactants may be charged to the reactor at a liquid hourly space velocity (the volume of liquid charge in relation to the volume of solid catalyst in the reaction zone per hour) in the range of from about 1 up to about 25 or more depending upon the catalyst and temperature utilized in the reaction. When using the lower space velocities, hereinbefore set forth, it may be preferable to have a substantially inert organic solvent comprising a high boiling paraffin such as n-heptane or an aromatic hydrocarbon such as benzene, toluene, etc., present in the reactor.

A particularly suitable type of operation when using a solid metal halide catalyst of the type hereinbefore described comprises a fixed bed type in which the desired catalyst is disposed as a bed in the reaction zone and the reactants are passed in either an upward or downward flow. Another continuous type of process, under suitable types of operating conditions of temperature and pressure, may include a fluidized bed type of operation in which the alkyl halide and 1,2-diolefinic hydrocarbon along with the solid catalyst are maintained in a state of turbulence under hindered settling conditions in the reaction zone; the compact moving bed type of operation in which the reactants pass either concurrently or countercurrently to each other, and the slurry type process in which the catalyst is carried into the reaction zone as a slurry in one of the reactants. In each of the aforementioned types of processes, the unreacted materials are separated out and recycled for use as a portion of the feed stock while the desired condensation products are withwithdrawn and separated from any by-products which may have been formed by the reaction and recovered by conventional means of the type hereinbefore set forth.

As hereinbefore set forth, the products prepared according to the process of this invention, namely, vinyl halide monomers are utilized as starting materials for the preparation of the class of plastic materials known generically as polyvinyl halides, the most common of these being polyvinyl chloride and polyvinyl fluoride. The former can be used for sheets, pipes, in extruded or covering reinforcing agents, coatings, etc. It may also be used to form a type of plastic material known as polyvinyl chloride-acetate which may be used in a manner similar to that hereinbefore set forth, that is, as injection molding powders, in which the finished product possesses the outstanding properties of strength, good dielectric properties, as well as resistance to water, soap, acids, alkalides, and alcohol. In addition the resins which may be formed are also used for electrical insulation in molding, coating paper, lacquers, floor tile and phonograph records. Examples of vinyl halides which may be prepared according to the process of this invention includes those which possess the generic formula:

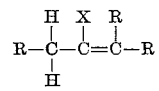

in which R is selected from the group consisting of hydrogen and alkyl radicals, said alkyl radicals containing from 1 up to about 10 carbon atoms or more. Specific examples of these compounds include 2-chloro-1-pentene, 2-bromo-1-pentene, 2-iodo-1-pentene, 2-fluoro-1-pentene, 2 - chloro - 4 - methyl - 1 pentene, 2 - bromo - 4 - methyl- 1 - pentene, 2 - iodo - 4 - methyl - 1 - pentene, 2-fluoro - 4 - methyl - 1 - pentene, 2 - chloro - 4,4 - dimethyl - 1 - pentene, 2 - bromo - 4,4 - dimethyl - 1- pentene, 2 - iodo - 4 - 1 - pentene, 2 - fluoro - 4 - methyl- 1 - pentene, 2 - chloro - 1 - hexene, 2 - bromo - 1- pentene, 2 - iodo - 1 - pentene, 2 - fluoro - 1 - pentene, 3 - chloro - 2 - hexene, 3 - bromo - 2 - hexene, 3 - iodo- 2 - hexene, 3 - fluoro - 2 - hexene, 3 - chloro - 5 - methyl- 2 - hexene, 3 - bromo - 5 - methyl - 2 - hexene, 3 - iodo- 5 - methyl - 2 - hexene, 3 - fluoro - 5 - methyl - 2- hexene, 2 - chloro - 1 - heptene, 2 - bromo - 1 - heptene, 2 - iodo - 1 - heptene, 2 - fluoro - 1 - heptene, 3 - chloro- 6 - methyl - 2 - heptene, 3 - bromo - 6 - methyl - 2- heptene, 3 - iodo - 6 - methyl - 2 - heptene, 3 - fluoro- 6 - methyl - 2 - heptene, etc. It is to be understood that the aforementioned compounds are only representative of the vinyl halides which may be prepared according to the present process and that the present invention is not necessarily limited thereto.

The following examples are given to illustrate the process of the present invention which, however, are not intended to limit the generally broad scope of the present invention in strict accordance therewith.

*Example 1*

A stirred mixture of 78 g. (1.0 mole) of isopropyl chloride and 6 g. of anhydrous aluminum chloride is placed in a reaction vessel which is maintained by means of external cooling means at a temperature of about 3° C. Following this, 20 g. (0.5 mole) of propadiene is passed into the mixture during a period of about 1.5 hours, while maintaining the reaction mixture at a temperature of from about 2° to about 6° C. and at autogenous pressure. At the end of this time, the reaction vessel and contents thereof are allowed to warm to room temperature. The reaction mixture is separated from the catalyst and subjected to fractional distillation under reduced pressure, the desired product comprising 2-chloro-4-methyl-1-pentene being recovered therefrom.

*Example II*

In this example, 78 g. (1.0 mole) of isopropyl chloride and 6 g. of anhydrous aluminum chloride are placed in a reaction vessel which is then cooled to a temperature of about −20° C. Following this, 27 g. (0.5 mole) of 1,2-butadiene is added during a period of about 1.5 hours while constantly stirring the reaction mixture. During the addition of 1,2-butadiene, the reacton vessel and contents thereof are maintained at a temperature ranging from about −20° C. to about −10° C. At the end of the residence time, the vessel and contents thereof are allowed to warm to room temperature, following which the catalyst layer is separated from the liquid layer. The reaction product is subjected to fractional distillation under reduced pressure and the desired product comprising 3-chloro-5-methyl-2-hexene is separated and recovered.

*Example III*

A reactor containing a mixture of t-butyl bromide and 5 g. of zinc chloride is heated to a temperature of about 50° C. Following this, 41 g. (1.0 mole) of propadiene is charged to the reactor during a period of about 2 hours, the reaction mixture being constantly stirred during the addition period. At the end of this reaction time, the reactor and contents thereof are allowed to cool to room temperature and the catalyst layer separated from the liquid layer. This liquid layer is then subjected to fractional distillation under reduced pressure, 2-bromide-4,4-dimethyl-1 pentene is separated and recovered.

*Example IV*

A mixture of 106 g. (1.0 mole) of t-amyl chloride and 10 g. of ferric chloride is placed in a glass-lined autoclave. Following this, 41 g. (1.0 mole) of propadiene is charged to the autoclave which is then rotated for a period of about 4 hours at room temperature (about 25° C.). At the end of this time, the autoclave is opened and the reaction produce is removed therefrom. The liquid product is separated from the catalyst, is washed in caustic and water, then dried and subjected to fractional distillation under reduced pressure, the desired product comprising 2-chloro-4,4-dimethyl-1-hexene is separated and recovered.

*Example V*

A mixture of 111 g. (1.0 mole) of n-propyl bromide and 7 g. of aluminum chloride is placed in a reaction vessel which is thereafter cooled to a temperature of about −15° C. Following this, 54 g. (1.0 mole) of 1,2-butadiene is introduced at atmospheric pressure during a period of about 1.5 hours while constantly stirring the mixture. During the addition period, the temperature of the reactor is maintained in a range of about −15° to −10° C. At the end of this time, the vessel is allowed to warm to room temperature, the liquid product is separated from the catalyst layer and subjected to fractional distillation under reduced pressure, the desired product comprising 3-bromo-2-heptene is separated and recovered.

I claim as my invention:

1. A process for the preparation of an unsaturated halide compound which comprises condensing an alkyl halide selected from the group consisting of alkyl chlorides and alkyl bromides with a 1,2-diolefinic hydrocarbon at a temperature in the range of from about −50° to about 150° C. and at a pressure of from about atmospheric to about 100 atmospheres in the presence of a Friedel-Crafts type catalyst and recovering the resultant unsaturated halide compound.

2. A process for the preparation of an unsaturated halide compound which comprises condensing an alkyl halide selected from the group consisting of alkyl chlorides and alkyl bromides with a 1,2-diolefinic hydrocarbon at a temperature in the range of from about −50° to about 150° C. and at a pressure of from about atmospheric to about 100 atmospheres in the presence of aluminum chloride and recovering the resultant unsaturated halide compound.

3. A process for the preparation of an unsaturated halide compound which comprises condensing an alkyl halide selected from the group consisting of alkyl chlorides and alkyl bromides with a 1,2-diolefinic hydrocarbon at a temperature in the range of from about −50° to about 150° C. and at a pressure of from about atmospheric to about 100 atmospheres in the presence of zinc chloride and recovering the resultant unsaturated halide compound.

4. A process for the preparation of an unsaturated halide compound which comprises condensing an alkyl halide selected from the group consisting of alkyl chlorides and alkyl bromides with a 1,2-diolefinic hydrocarbon at a temperature in the range of from about −50° to about 150° C. and at a pressure of from about atmospheric to about 100 atmospheres in the presence of ferric chloride and recovering the resultant unsaturated halide compound.

5. A process for the preparation of an unsaturated halide compound which comprises condensing an alkyl halide selected from the group consisting of alkyl chlorides and alkyl bromides with a 1,2-diolefinic hydrocarbon at a temperature in the range of from about −50° to about 150° C. and at a pressure of from about atmospheric to about 100 atmospheres in the presence of zirconium chloride and recovering the resultant unsaturated halide compound.

6. A process for the preparation of an unsaturated chloride compound which comprises condensing isopropyl chloride with a 1,2-diolefinic hydrocarbon at a temperature in the range of from about −50° to about 150° C. and at a pressure of from about atmospheric to about 100 atmospheres in the presence of a Friedel-Crafts type catalyst and recovering the resultant unsaturated chloride compound.

7. A process for the preparation of an unsaturated bromide compound which comprises condensing t-butyl bromide with a 1,2-diolefinic hydrocarbon at a temperature in the range of from about −50° to about 150° C. and at a pressure of from about atmospheric to about 100 atmospheres in the presence of a Friedel-Crafts type catalyst and recovering the resultant unsaturated bromide compound.

8. A process for the preparation of an unsaturated chloride compound which comprises condensing t-amyl chloride with a 1,2-diolefinic hydrocarbon at a temperature in the range of from about −50° to about 150° C. and at a pressure of from about atmospheric to about 100 atmospheres in the presence of a Friedel-Crafts type catalyst and recovering the resultant unsaturated chloride compound.

9. A process for the preparation of an unsaturated bromide compound which comprises condensing ethyl bromide with a 1,2-diolefinic hydrocarbon at a temperature in the range of from about −50° to about 150° C. and at a pressure of from about atmospheric to about 100 atmospheres in the presence of a Friedel-Crafts type catalyst and recovering the resultant unsaturated bromide compound.

10. A process for the preparation of an unsaturated chloride compound which comprises condensing propadiene with isopropyl chloride at a temperature in the range of from about −50° to about 150° C. and at a pressure in the range of from about atmospheric to about 100 atmospheres in the presence of aluminum chloride and recovering the resultant 2-chloro-4-methyl-1-pentene.

11. A process for the preparation of an unsaturated chloride compound which comprises condensing 1,2-butadiene with isopropyl chloride at a temperature in the range of from about −50° to about 150° C. and at a pressure in the range of from about atmospheric to about 100 atmospheres in the presence of aluminum chloride and recovering the resultant 3-chloro-5-methyl-2-hexene.

12. A process for the preparation of an unsaturated bromide compound which comprises condensing t-butyl bromide with propadiene at a temperature in the range of from about −50° to about 150° C. and at a pressure in the range of from about atmospheric to about 100 atmospheres in the presence of zinc chloride and recovering the resultant 2-bromo-4,4-dimethyl-1-pentene.

13. A process for the preparation of an unsaturated chloride compound which comprises condensing t-amyl chloride with propadiene at a temperature in the range of from about −50° to about 150° C. and at a pressure in the range of from about atmospheric to about 100 atmospheres in the presence of ferric chloride and recovering the resultant 2-chloro-4,4-dimethyl-1-hexene.

14. A process for the preparation of an unsaturated bromide compound which comprises condensing n-propyl bromide with 1,2-butadiene at a temperature in the range of from about −50° to about 150° C. and at a pressure in the range of from about atmospheric to about 100 atmospheres in the presence of aluminum chloride and recovering the resultant 3-bromo-2-heptene.

References Cited
UNITED STATES PATENTS 3,290,397  12/1966  Rust et al. _____ 260—654

LEON ZITVER, *Primary Examiner.*

J. BOSKA, *Assistant Examiner.*